（12）United States Patent
Brodsky et al.

(10) Patent No.: US 9,337,653 B2
(45) Date of Patent: May 10, 2016

(54) STATIC MEMS SWITCH FOR ESD PROTECTION

(71) Applicant: Texas Instruments Incorporated, Dallas, TX (US)

(72) Inventors: Jonathan Scott Brodsky, Richardson, TX (US); John Eric Kunz, Jr., Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/966,813

(22) Filed: Aug. 14, 2013

(65) Prior Publication Data

US 2014/0049864 A1    Feb. 20, 2014

Related U.S. Application Data

(60) Provisional application No. 61/683,000, filed on Aug. 14, 2012.

(51) Int. Cl.
*H02H 9/04* (2006.01)

(52) U.S. Cl.
CPC .................................... *H02H 9/046* (2013.01)

(58) Field of Classification Search
CPC ........................................................ H02H 9/046
USPC ................................................................ 361/56
See application file for complete search history.

(56) References Cited

U.S. PATENT DOCUMENTS

| | | | |
|---|---|---|---|
| 5,946,175 A * | 8/1999 | Yu ..................................... | 361/56 |
| 6,847,266 B2 * | 1/2005 | Laney et al. ..................... | 333/12 |
| 7,212,387 B2 * | 5/2007 | Duvvury et al. ................. | 361/56 |
| 7,974,052 B2 * | 7/2011 | Farbarik et al. ................. | 361/56 |
| 8,638,093 B2 * | 1/2014 | Aimi et al. ..................... | 324/300 |
| 8,692,605 B2 * | 4/2014 | Jao ................................. | 327/309 |
| 2003/0058069 A1 * | 3/2003 | Schwartz et al. ............... | 335/78 |
| 2010/0012471 A1 * | 1/2010 | Majumder et al. ............ | 200/181 |

* cited by examiner

*Primary Examiner* — Scott Bauer
(74) *Attorney, Agent, or Firm* — Jacqueline J. Garner; Frank D. Cimino (57) ABSTRACT

An integrated circuit with either a normally open MEMS ESD protection switch coupled between a bond pad and an internal circuit or a normally closed MEMS ESD protection switch coupled between the bond pad and a common reference of the integrated circuit. At least one of a control bond pad and an enable logic circuit is coupled to a control terminal of the MEMS ESD protection switch.

7 Claims, 5 Drawing Sheets

STATIC MEMS SWITCH FOR ESD PROTECTION

CROSS-REFERENCE TO RELATED APPLICATIONS

This application claims the benefit of priority under U.S.C. §119(e) of U.S. Provisional Application 61/683,000.

FIELD OF THE INVENTION

This invention relates to the field of integrated circuits. More particularly, this invention relates to a microelectronic mechanical system (MEMS) electrostatic discharge (ESD) protection switch.

BACKGROUND OF THE INVENTION

Electrostatic discharge (ESD) is a continuing problem in the design, manufacture, and utilization of integrated circuits. A major source of ESD exposure to integrated circuits is from the human body (described by the "Human Body Model", HBM). In this situation, a packaged integrated circuit acquires a charge when it is touched by a human who is electrostatically charged (e.g. From walking across a carpet). A charge of about 0.4 uC may be induced on a body capacitance of 100 pF, for example, leading to an electrostatic potential of 4 kV or more and discharge peak currents of several amperes to the integrated circuit for longer than 100 ns. A second source of ESD exposure is from charged metallic objects (described by the "Machine Model", MM), which is characterized by a greater capacitance, lower internal resistance and transients that have significantly higher peak current levels than a HBM ESD source. A third source of ESD exposure is due to the discharge of stored charge on the integrated circuit itself (described by the "Charged Device Model", CDM), to ground with rise times of less than 500 ps. For all three sources of ESD exposure, both positive and negative polarity discharges may occur.

As silicon technologies scale, transistor safe-operating area is reduced causing ESD protection requirements to become more stringent. The increased requirements are causing the die area for the ESD circuits to increase. The increased die area drives up cost and increased parasitic capacitance from the ESD protection circuit results in increased functional degradation of the integrated circuit. It is therefore desirable to provide adequate ESD protection while at the same time reducing ESD circuit area and also reducing the impact of the ESD circuit upon the integrated circuit performance.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

An integrated circuit has an internal circuit and a bond pad coupled to the internal circuit. Either a normally open MEMS ESD protection switch is coupled between the bond pad and the internal circuit or a normally closed MEMS ESD protection switch is coupled between the bond pad and a common reference of the integrated circuit. At least one of a control bond pad and an enable logic circuit is coupled to a control terminal of the MEMS ESD protection switch.

DETAILED DESCRIPTION OF EXAMPLE EMBODIMENTS

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

An integrated circuit has an internal circuit and a bond pad coupled to the internal circuit. Either a normally open MEMS ESD protection switch is coupled between the bond pad and the internal circuit or a normally closed MEMS ESD protection switch is coupled between the bond pad and a common reference of the integrated circuit. At least one of a control bond pad and an enable logic circuit is coupled to a control terminal of the MEMS ESD protection switch.

MEMS switches may have much lower off-state leakage currents than transistors, which make them particularly advantageous for use as ESD protection switches. Also, MEMS switches may have much lower on-state resistances than transistors with comparable standoff voltage ratings, adding to MEMS switches' desirability for use as ESD protection switches.

For the purposes of this disclosure, the term "bond pad" is understood to refer to wire bond pad, solder bump bond pad, or other metal element which electrically couples an integrated circuit to external electrical elements.

Figure 1:
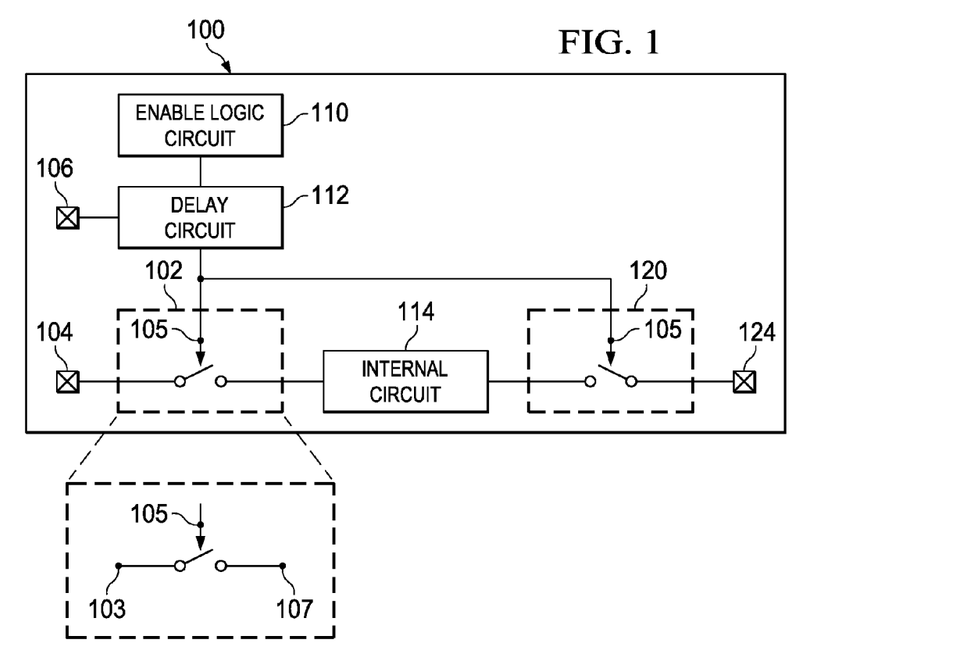
FIG. 1 is a diagram of an exemplary integrated circuit containing a normally open MEMS ESD protection switch.

FIG. 1 is a diagram of an exemplary integrated circuit containing a normally open MEMS ESD protection switch. The integrated circuit 100 contains an internal circuit 114 and a first bond pad 104. The first bond pad 104 is electrically coupled to the internal circuit 114 through the normally open MEMS ESD protection switch 102. During operation of the integrated circuit 100, input and/or output signals are provided to and/or from the internal circuit 114, respectively, through the first bond pad 104.

The normally open MEMS ESD protection switch 102, hereinafter the first MEMS switch 102, is a three terminal device with a first input/output terminal 103, a second input/output terminal 107, and a control terminal 105. When no on-state control signal is applied to the control terminal 105, the first MEMS switch 102 is open. Similarly, when a ground (Vss) bias is applied to the control terminal 105, the first MEMS switch 102 is open. When an on-state control signal, for example a Vdd bias voltage, is applied to the control terminal 105, the first MEMS switch 102 closes, electrically coupling the first bond pad 104 to the internal circuit 114. The first MEMS switch 102 remains open until the on-state control signal is provided to the control terminal 105.

The integrated circuit 100 includes at least one of a control bond pad 106 which is coupled to the control terminal 105 of the first MEMS switch 102 and an enable logic circuit 110 which is coupled to the control terminal 105 of the first MEMS switch 102. A signal source external to the integrated circuit 100 may provide the on-state control signal through the control bond pad 106 to the control terminal 105. The enable logic circuit 110 may provide the on-state control signal to the control terminal 105 to allow various logic functions to open or close the first MEMS switch 102. For example, the enable logic circuit 110 may be configured to provide the on-state control signal when power is applied to the integrated circuit 100. Alternatively, the enable logic circuit 110 may be configured to provide the on-state control signal when the internal circuit 114 provides a signal to the enable logic circuit 110 or sets a control resister which is monitored by the logic circuit 110 indicating input/output signals are to be provided to and/or from the internal circuit 114, respectively, through the first bond pad 104.

The integrated circuit 100 may optionally include a delay circuit 112 coupled between the control bond pad 106 and the control terminal 105, and/or coupled between the enable logic circuit 110 and the control terminal 105.

During handling of the integrated circuit 100, no on-state control signal is provided to the control terminal 105 so the first MEMS switch 102 is opened. In the event of an ESD strike to the first bond pad 104 during handling, the first MEMS switch 102 being open isolates the first bond pad 104 from the internal circuit 114 and thus protects the internal circuit 114 from damage. In the instant example, the integrated circuit 100 may possibly be free of an ESD circuit connected to the first bond pad 104, so as to advantageously reduce performance degradation of the internal circuit 114 due to parasitic capacitance and resistance normally associated with an ESD circuit. In this example the first MEMS switch 102 may be designed to be sufficiently robust to avoid arcing across the first MEMS switch 102 during an ESD strike. The optional delay circuit 112 may prevent the first MEMS switch 102 from closing during an ESD strike.

During operation of the integrated circuit 100, an on-state control signal is provided to the control terminal 105 so the first MEMS switch 102 is closed. The on-state control signal may be applied through the control bond pad 106 if present and/or through the enable logic circuit 110 if present. Closing the first MEMS switch 102 during operation of the integrated circuit 100 allows input and/or output signals to be provided to and/or from the internal circuit 114, respectively, through the first bond pad 104.

A second bond pad 124 may be coupled to the internal circuit 114 through a second MEMS switch 120. The second MEMS switch 120 is normally open like the first MEMS switch 102 and has a control terminal 105. The control bond pad 106 and/or the enable logic circuit 110, whichever are present, are coupled to the control terminal 105 of the second MEMS switch 120, through the delay circuit 112 if present. Controlling a plurality of MEMS switches 102 and 120 with the control bond pad 106 and/or the enable logic circuit 110 may advantageously reduce a size and cost of the integrated circuit 100.

Figure 2:
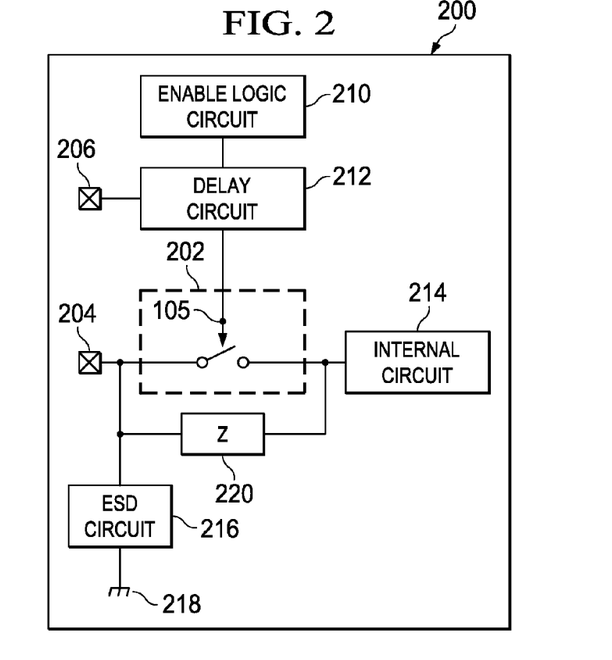
FIG. 2 is a diagram of another exemplary integrated circuit containing a normally open MEMS switch.

FIG. 2 is a diagram of another exemplary integrated circuit containing a normally open MEMS switch. The integrated circuit 200 contains an internal circuit 214 and a bond pad 204. The bond pad 204 is electrically coupled to the internal circuit 214 through the normally open MEMS switch 202. The MEMS switch 202 remains open until an on-state control signal, for example a Vdd bias, is provided to a control terminal 205 of the MEMS switch 202 as described in reference to FIG. 1. During operation of the integrated circuit 200, input and/or output signals are provided to and/or from the internal circuit 214, respectively, through the bond pad 204. The integrated circuit 200 includes at least one of a control bond pad 206 which is coupled to the control terminal 205 of the MEMS switch 202 and an enable logic circuit 210 which is coupled to the control terminal 205 of the MEMS switch 202. The integrated circuit 200 may optionally include a delay circuit 212 coupled between the control bond pad 206 and the control terminal 205, and/or coupled between the enable logic circuit 210 and the control terminal 205. Functions of the control bond pad 206, the enable logic circuit 210 and the delay circuit 212 are as described in reference to FIG. 1.

The bond pad 204 is coupled through an ESD circuit 216 of the integrated circuit 200 to a common reference 218 of the integrated circuit 200 such as a Vss bus, a Vdd bus or a substrate of the integrated circuit 200. The ESD circuit 216 is connected to the bond pad 204 and is coupled to the internal circuit 214 through the MEMS switch 202. In the event of an ESD strike to the bond pad 204 during handling, the ESD circuit 216 and the open MEMS switch 202 protect the internal circuit 214 from damage. In the instant example, the ESD circuit 216 may also protect the MEMS switch 202 from damage during an ESD strike. Performance requirements for the ESD circuit 216, such as current capacity and response time, may be relaxed compared to an ESD circuit connected to a bond pad without a normally open MEMS switch. Relaxing the performance requirements may advantageously allow the ESD circuit 216 to have reduced parasitic elements, such as capacitance and leakage current, so that performance of the internal circuit 214 may desirably be increased.

The integrated circuit 200 may include an optional impedance 220 such as a resistor and/or an inductor, connected between the internal circuit 214 and the ESD circuit 216, in parallel with the MEMS switch 202. The impedance 220, in combination with the ESD circuit 216, may advantageously protect the internal circuit 214 from charge buildup when the MEMS switch 202 is open.

Figure 3:
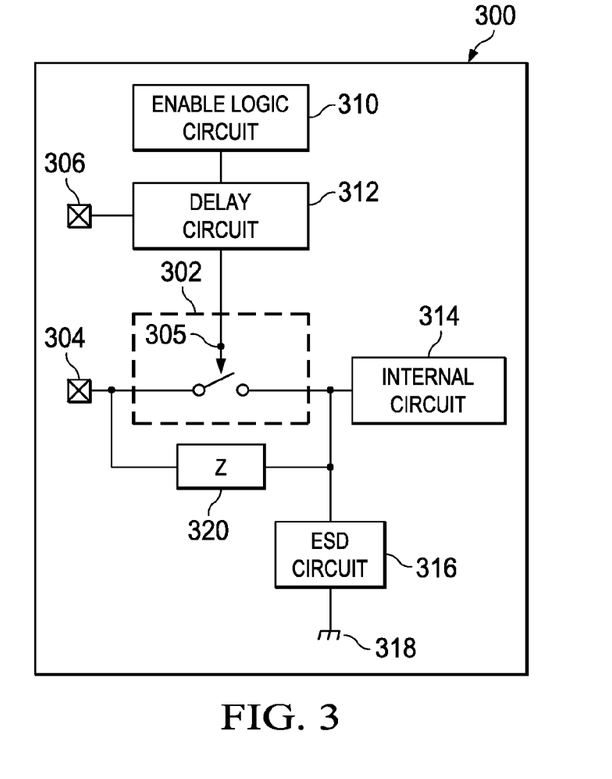
FIG. 3 is a diagram of a further exemplary integrated circuit containing a normally open MEMS switch.

FIG. 3 is a diagram of a further exemplary integrated circuit containing a normally open MEMS switch. The integrated circuit 300 contains an internal circuit 314 and a bond pad 304. The bond pad 304 is electrically coupled to the internal circuit 314 through the normally open MEMS switch 302. The MEMS switch 302 remains open until an on-state control signal, for example a Vdd bias, is provided to a control terminal 305 of the MEMS switch 302 as described in reference to FIG. 1. During operation of the integrated circuit 300, input and/or output signals are provided to and/or from the internal circuit 314, respectively, through the bond pad 304. The integrated circuit 300 includes at least one of a control bond pad 306 which is coupled to the control terminal 305 of the MEMS switch 302 and an enable logic circuit 310 which is coupled to the control terminal 305 of the MEMS switch 302. The integrated circuit 300 may optionally include a delay circuit 312 coupled between the control bond pad 306 and the control terminal 305, and/or coupled between the enable logic circuit 310 and the control terminal 305. Functions of the control bond pad 306, the enable logic circuit 310 and the delay circuit 312 are as described in reference to FIG. 1.

The internal circuit 314 is connected through an ESD circuit 316 of the integrated circuit 300 to a common reference 318 of the integrated circuit 300 such as a Vss bus, a Vdd bus or a substrate of the integrated circuit 300. The ESD circuit 316 is connected to the internal circuit 314 and is coupled to the bond pad 304 through the MEMS switch 302. The integrated circuit 200 also includes an impedance 320 such as a resistor and/or an inductor, connected between the internal circuit 314 and the ESD circuit 316, in parallel with the MEMS switch 302. In the event of an ESD strike to the bond pad 304 during handling, the ESD circuit 316 and the impedance 320 protect the internal circuit 314 from damage.

Figure 4:
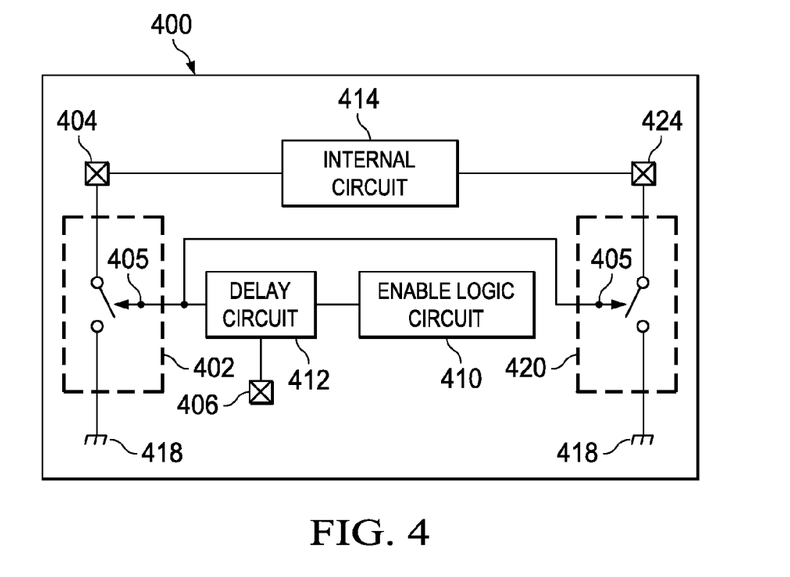
FIG. 4 is a diagram of an exemplary integrated circuit containing a normally closed MEMS switch.

FIG. 4 is a diagram of an exemplary integrated circuit containing a normally closed MEMS switch. The integrated circuit 400 contains an internal circuit 414 and a first bond pad 404. The first bond pad 404 is electrically coupled to the internal circuit 414. The first bond pad 404 is coupled through the normally closed MEMS switch 402, hereinafter the first MEMS switch 402, to a common reference 418 of the integrated circuit 400 such as a Vss bus, a Vdd bus or a substrate of the integrated circuit 400. The first MEMS switch 402 remains closed until an on-state control signal, for example a Vdd bias, is provided to a control terminal 405 of the first MEMS switch 402. In the event of an ESD strike to the first bond pad 404 during handling, the ESD circuit 416 through the closed first MEMS switch 402 protects the internal circuit 414 from damage.

The integrated circuit 400 includes at least one of a control bond pad 406 which is coupled to the control terminal 405 of the first MEMS switch 402 and an enable logic circuit 410 which is coupled to the control terminal 405 of the first MEMS switch 402. The integrated circuit 400 may optionally include a delay circuit 412 coupled between the control bond pad 406 and the control terminal 405, and/or coupled between the enable logic circuit 410 and the control terminal 405. During operation of the integrated circuit 400, an on-state control signal may be provided to the control terminal 405 so the first MEMS switch 402 is opened. The on-state control signal may be applied through the control bond pad 406 if present and/or through the enable logic circuit 410 if present. Opening the first MEMS switch 402 during operation of the integrated circuit 400 may advantageously increase performance of the internal circuit 414, as parasitic elements of the ESD circuit 416 are not directly coupled to the internal circuit 414. The on-state control signal may be applied continuously when the integrated circuit 400 is operating, or may be applied selectively, for example when enhanced performance of the internal circuit 414 is needed.

A second bond pad 424 may be coupled to the internal circuit 414. A second MEMS switch 420 couples the second bond pad 424 to the common reference 418. The second MEMS switch 420 is normally closed like the first MEMS switch 402 and has a control terminal 405. The control bond pad 406 and/or the enable logic circuit 410, whichever are present, are coupled to the control terminal 405 of the second MEMS switch 420, through the delay circuit 412 if present. Controlling a plurality of MEMS switches 402 and 420 with the control bond pad 406 and/or the enable logic circuit 410 may advantageously reduce a size and cost of the integrated circuit 400.

Figure 5:
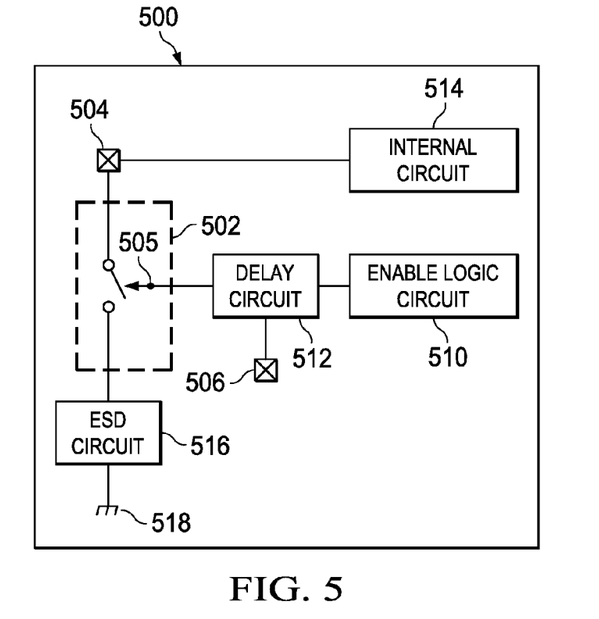
FIG. 5 is a diagram of another exemplary integrated circuit containing a normally closed MEMS switch.

FIG. 5 is a diagram of another exemplary integrated circuit containing a normally closed MEMS switch. The integrated circuit 500 contains an internal circuit 514 and a bond pad 504. The bond pad 504 is electrically coupled to the internal circuit 514. The bond pad 504 is coupled through the normally closed MEMS switch 502, hereinafter the MEMS switch 502, in series with an ESD circuit 516 of the integrated circuit 500 to a common reference 518 of the integrated circuit 500 such as a Vss bus, a Vdd bus or a substrate of the integrated circuit 500. The MEMS switch 502 remains closed until an on-state control signal, for example a Vdd bias, is provided to a control terminal 505 of the MEMS switch 502. In the event of an ESD strike to the bond pad 504 during handling, the ESD circuit 516 through the closed MEMS switch 502 protects the internal circuit 514 from damage.

The integrated circuit 500 includes at least one of a control bond pad 506 which is coupled to the control terminal 505 of the MEMS switch 502 and an enable logic circuit 510 which is coupled to the control terminal 505 of the MEMS switch 502. The integrated circuit 500 may optionally include a delay circuit 512 coupled between the control bond pad 506 and the control terminal 505, and/or coupled between the enable logic circuit 510 and the control terminal 505. During operation of the integrated circuit 500, an on-state control signal may be provided to the control terminal 505 so the MEMS switch 502 is opened. The on-state control signal may be applied through the control bond pad 506 if present and/or through the enable logic circuit 510 if present. Opening the MEMS switch 502 during operation of the integrated circuit 500 may advantageously increase performance of the internal circuit 514, as parasitic elements of the ESD circuit 516 are not directly coupled to the internal circuit 514. The on-state control signal may be applied continuously when the integrated circuit 500 is operating, or may be applied selectively, for example when enhanced performance of the internal circuit 514 is needed.

Figure 6:
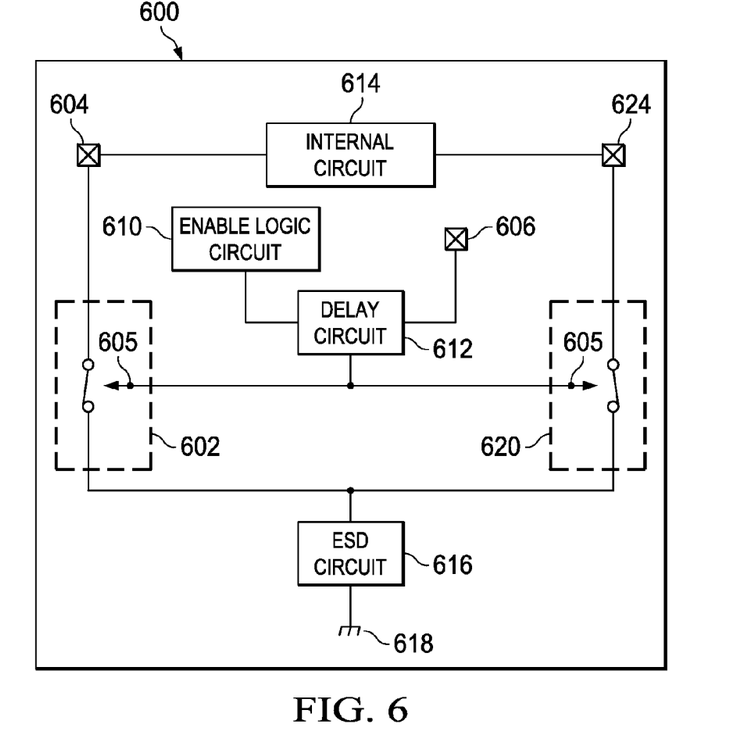
FIG. 6 is a diagram of an exemplary integrated circuit containing a plurality of normally closed MEMS switches.

FIG. 6 is a diagram of an exemplary integrated circuit containing a plurality of normally closed MEMS switches. The integrated circuit 600 contains an internal circuit 614, a first bond pad 604 and a second bond pad 624. The first bond pad 604 and the second bond pad are electrically coupled to the internal circuit 614. The first bond pad 604 is coupled through a first normally open MEMS switch 602 in series with an ESD circuit 616 of the integrated circuit 600 to a common reference 618 of the integrated circuit 600 such as a Vss bus, a Vdd bus or a substrate of the integrated circuit 600. The second bond pad 624 is coupled through a second normally open MEMS switch 603 in series with the ESD circuit 616 to the common reference 618.

Each MEMS switch 602 and 603 remains closed until an on-state control signal, for example a Vdd bias, is provided to a control terminal 605 of each MEMS switch 602 and 603. In the event of an ESD strike to the bond pad 604 during handling, the ESD circuit 616 through the closed MEMS switches 602 and 603 protects the internal circuit 614 from damage. Coupling more than one bond pad to the ESD circuit 616 through the MEMS switches 602 and 603 may advantageously reduce a size and cost of the integrated circuit 600 compared to an integrated circuit with separate ESD circuits at each bond pad.

The integrated circuit 600 includes at least one of a control bond pad 606 which is coupled to each control terminal 605 of the MEMS switches 602 and 603, and an enable logic circuit 610 which is coupled to each control terminal 605 of the MEMS switches 602 and 603. The integrated circuit 600 may optionally include a delay circuit 612 coupled between the control bond pad 606 and the control terminal 605, and/or coupled between the enable logic circuit 610 and the control terminal 605. During operation of the integrated circuit 600, an on-state control signal may be provided to each control terminal 605 so the MEMS switches 602 and 603 are opened. The on-state control signal may be applied through the control bond pad 606 if present and/or through the enable logic circuit 610 if present. Opening the MEMS switches 602 and 603 during operation of the integrated circuit 600 may advantageously increase performance of the internal circuit 614, as parasitic elements of the ESD circuit 616 are not directly coupled to the internal circuit 614. The on-state control signal may be applied continuously or selectively.

Figure 7A:
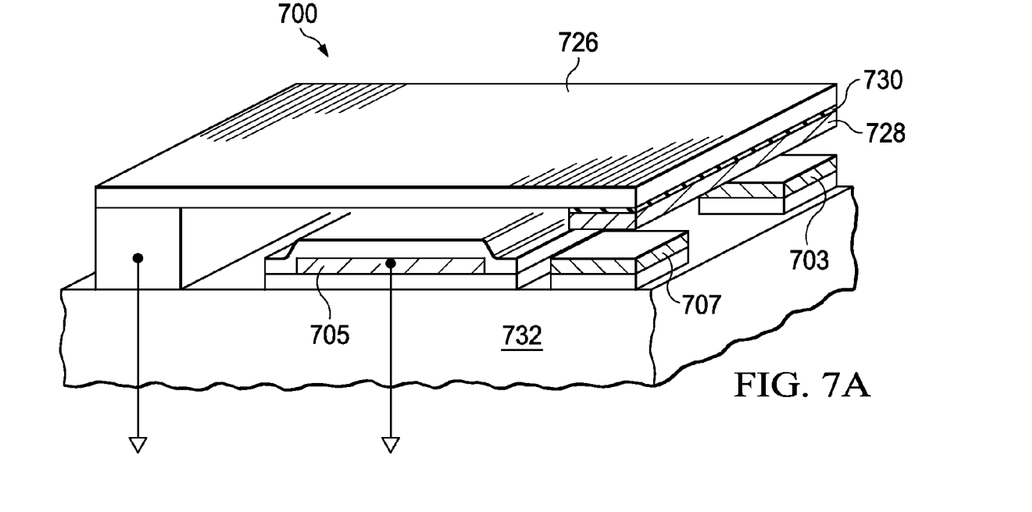
FIG. 7A and FIG. 7B are cross sections of an exemplary normally open MEMS switch.
Figure 7B:
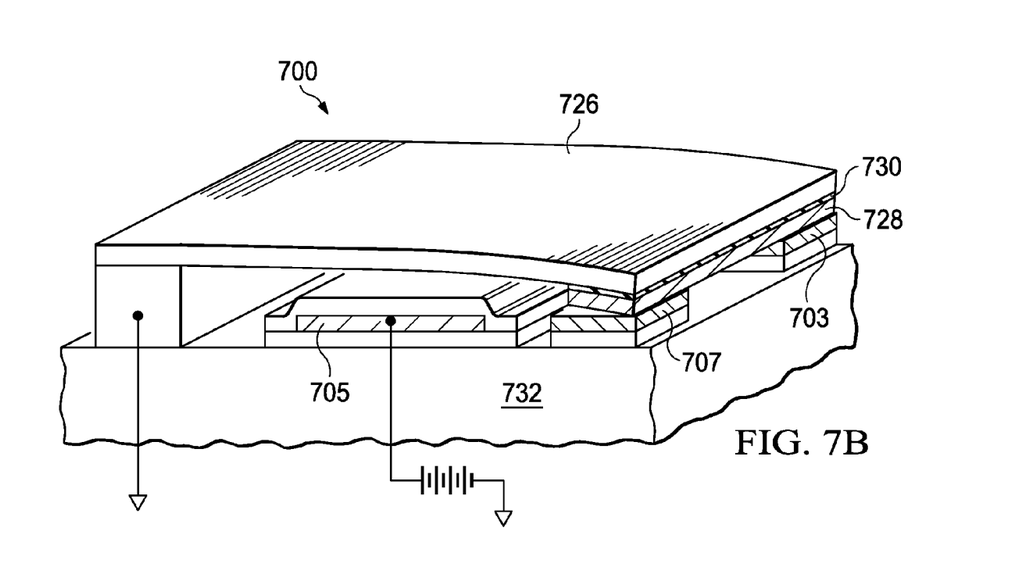

FIG. 7A and FIG. 7B are cross sections of an exemplary normally open MEMS switch. Referring to FIG. 7A, the normally open MEMS switch 700 is in an unpowered, and thus open, state. The normally open MEMS switch 700 includes a first input/output terminal 703, a second input/output terminal 707, and a control terminal 705. An electrically conducting cantilever beam 726 suspends an electrically conducting contactor bar 728 over the first input/output terminal 703 and the second input/output terminal 707. The electrically conducting cantilever beam 726 may be electrically isolated from the electrically conducting contactor bar 728 by a dielectric layer 730. The cantilever beam 726 is grounded, for example to a substrate 732 of an integrated circuit containing the normally open MEMS switch 700. The control terminal 705 is grounded in FIG. 7A, so there is no electrostatic attraction between the control terminal 705 and the cantilever beam 726. In this state, the cantilever beam 726 holds the contactor bar 728 above, and out of contact with, the first input/output terminal 703 and the second input/output terminal 707, so that the normally open MEMS switch 700 is in an open state.

Referring to FIG. 7B, the control terminal 705 is provided with an on-state control signal, that is, biased to a sufficient voltage so as to electrostatically attract the cantilever beam 726 and thereby contact the contactor bar 728 to the first input/output terminal 703 and the second input/output terminal 707, so that the normally open MEMS switch 700 is in a closed state. Other configurations of a normally open MEMS switch are within the scope of the examples of integrated circuits described herein.

Figure 8A:
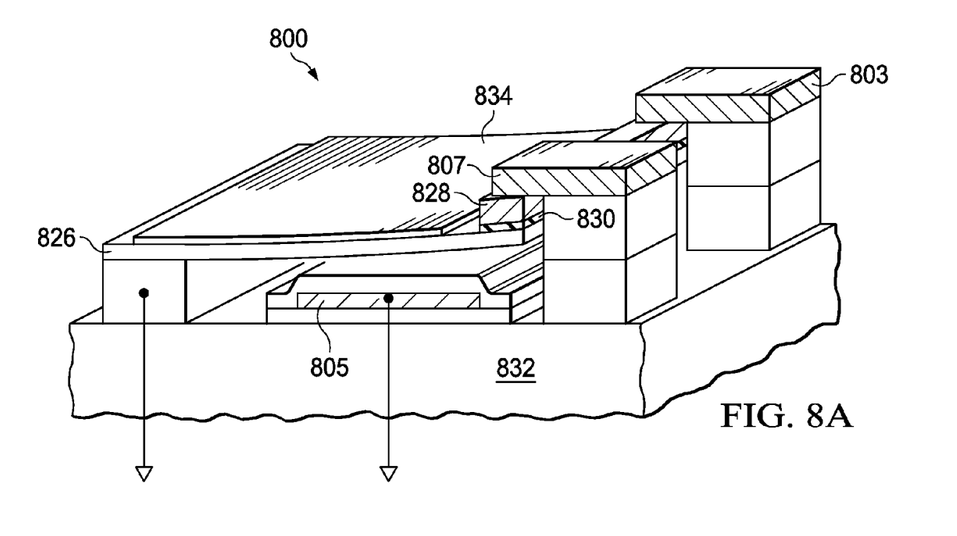
FIG. 8A and FIG. 8B are cross sections of an exemplary normally closed MEMS switch.
Figure 8B:
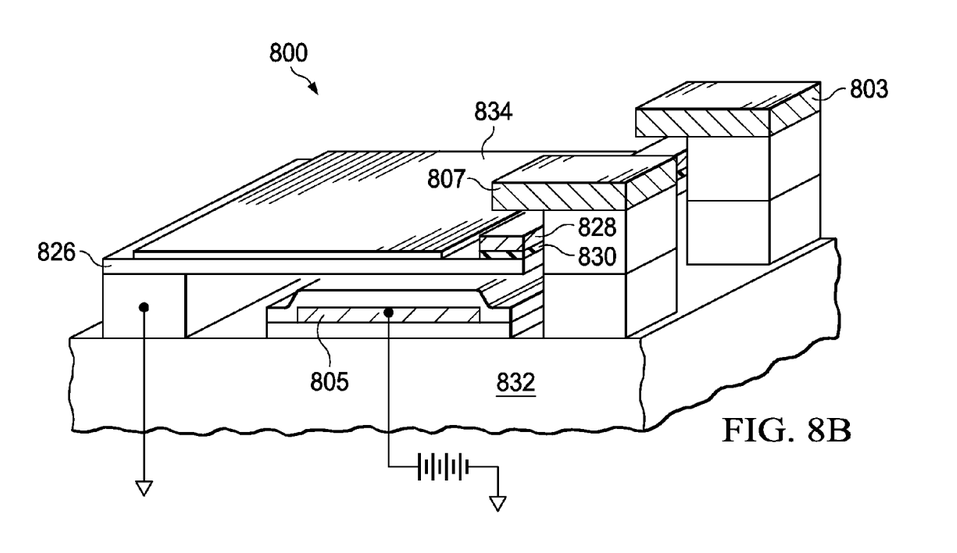

FIG. 8A and FIG. 8B are cross sections of an exemplary normally closed MEMS switch. Referring to FIG. 8A, the normally closed MEMS switch 800 is in an unpowered, and thus closed, state. The normally open MEMS switch 800 includes a first input/output terminal 803, a second input/output terminal 807, and a control terminal 805. An electrically conducting cantilever beam 826 holds an electrically conducting contactor bar 828 under, and in contact with, the first input/output terminal 803 and the second input/output terminal 807. The electrically conducting cantilever beam 826 may be electrically isolated from the electrically conducting contactor bar 828 by a dielectric layer 830. In the instant example, the cantilever beam 826 is flexed upward in the unpowered state by a tensile stressor layer 834. The cantilever beam 826 is grounded, for example to a substrate 832 of an integrated circuit containing the normally closed MEMS switch 800. The control terminal 805 is grounded in FIG. 8A, so there is no electrostatic attraction between the control terminal 805 and the cantilever beam 826. In this state, the cantilever beam 826 holds the contactor bar 828 up, and in contact with, the first input/output terminal 803 and the second input/output terminal 807, so that the normally closed MEMS switch 800 is in an closed state.

Referring to FIG. 8B, the control terminal 805 is provided with an on-state control signal, that is, biased to a sufficient voltage so as to electrostatically attract the cantilever beam 826 sufficiently to overcome the tensile stressor layer 834 and thereby separate the contactor bar 828 from the first input/output terminal 803 and the second input/output terminal 807, so that the normally closed MEMS switch 800 is in an open state. Other configurations of a normally closed MEMS switch are within the scope of the examples of integrated circuits described herein.

While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. An integrated circuit, comprising:
  an internal circuit;
  a first bond pad coupled to said internal circuit;
  a first normally closed MEMS ESD protection switch coupled between said first bond pad and a common reference of said internal circuit, said first normally closed MEMS ESD protection switch comprising a first input/output terminal, a second input/output terminal, and a control terminal, the first normally closed MEMS ESD protection switch further comprising:
    a cantilever arm coupled to a ground terminal at a first end, the cantilever arm comprising an electrically conductive material;
    an electrically conductive bar over a second end of the cantilever arm, the electrically conductive bar vertically aligned with both the first input/output terminal and the second input/output terminal as well as the electrically conductive material of the cantilever arm, wherein the cantilever arm extends over the control terminal at a location between the first end and the second end and the electrically conductive material of the cantilever arm is vertically and electrically isolated from the electrically conductive bar at the second end by a dielectric layer; and
  at least one of a control bond pad coupled to said control terminal of said first normally closed MEMS ESD protection switch and an enable logic circuit coupled to said control terminal of said first normally closed MEMS ESD protection switch.

2. The integrated circuit of claim 1, further comprising a delay circuit coupled to said control terminal of said first normally closed MEMS ESD protection switch, said least one of said control bond pad and said enable logic circuit being coupled to said control terminal of said first normally closed MEMS ESD protection switch through said delay circuit.

3. The integrated circuit of claim 1, further comprising:
  a second bond pad coupled to said internal circuit; and
  a second normally closed MEMS ESD protection switch coupled between said second bond pad and said common reference of said internal circuit, said second normally closed MEMS ESD protection switch comprising a first input/output terminal, a second input/output terminal, and a control terminal, in which said at least one of said control bond pad and said enable logic circuit is coupled to said control terminal of said second normally closed MEMS ESD protection switch.

4. The integrated circuit of claim 1, further comprising an ESD circuit coupled in series between said first normally closed MEMS ESD protection switch and said common reference of said integrated circuit.

5. The integrated circuit of claim 4, further comprising:
a second bond pad coupled to said internal circuit; and
a second normally closed MEMS ESD protection switch coupled between said second bond pad and said ESD circuit, said second normally closed MEMS ESD protection switch comprising a first input/output terminal, a second input/output terminal, and a control terminal, in which said at least one of said control bond pad and said enable logic circuit is coupled to said control terminal of said second normally closed MEMS ESD protection switch.

6. The integrated circuit of claim 1, in which said common reference is a substrate of said integrated circuit.

7. The integrated circuit of claim 1, in which said common reference is a Vss bus of said integrated circuit.

* * * * *